United States Patent
Falke et al.

[11] Patent Number: 5,871,677
[45] Date of Patent: Feb. 16, 1999

[54] METHOD OF MANUFACTURING A LIGHT, OPEN-PORED, MINERAL INSULATING BOARD

[75] Inventors: Silke Falke, Finsterwalde; Emmo Frey, Dachau; Frithjof Koerdt, Schönborn, all of Germany

[73] Assignee: Hebel Aktiengesellschaft, Emmering, Germany

[21] Appl. No.: 873,430

[22] Filed: Jun. 12, 1997

[30] Foreign Application Priority Data

Jul. 4, 1996 [DE] Germany .................. 196 26 953.9

[51] Int. Cl.⁶ .................................................. C04B 38/10
[52] U.S. Cl. .............................. 264/42; 264/43; 264/157
[58] Field of Search ............................. 264/42, 43, 101, 264/157

[56] References Cited

U.S. PATENT DOCUMENTS

| | | | |
|---|---|---|---|
| 3,047,908 | 8/1962 | Lundgren et al. | 264/42 |
| 3,065,514 | 11/1962 | Jakobsson et al. | 264/42 |
| 3,217,069 | 11/1965 | Williams | 264/42 |
| 3,891,009 | 6/1975 | Noda et al. | 264/42 |
| 3,953,563 | 4/1976 | Kihlstedt et al. | 264/42 |
| 4,158,685 | 6/1979 | Masaryk | 264/43 |
| 4,985,163 | 1/1991 | Kratel et al. | 264/42 |
| 5,055,429 | 10/1991 | James et al. | 264/42 |
| 5,520,729 | 5/1996 | Engert et al. | 264/42 |

FOREIGN PATENT DOCUMENTS

| | | | |
|---|---|---|---|
| 35 42 638 | 2/1987 | Germany | 264/42 |
| 4339137A1 | 12/1994 | Germany . | |
| 4327074A1 | 2/1995 | Germany . | |
| 4408088A1 | 11/1995 | Germany . | |
| 63-222028 | 9/1988 | Japan | 264/42 |

*Primary Examiner*—Allan R. Kuhns
*Attorney, Agent, or Firm*—Flynn, Thiel, Boutell & Tanis, P.C.

[57] ABSTRACT

In order to manufacture a light, open-pored, mineral insulating board with a gross density below 130 kg/m³ the following steps are employed:

a) producing a water-solids suspension by intensive mixing of the following raw materials in an intensive mixer with a rotating mix container and a mixer mechanism rotating at a higher speed, using water and, in each case referred to the total content of solids, 40 to 48 M % (mass percent) quartz flour with a specific surface area according to BET of at least 2.5 m²/g, 15 to 20 M % slaked lime with a specific surface area of at least 15 m²/g, 25 to 35 M % cement, 0.3 to 0.5 M % hydrophobic medium, the rest additives, wherein the ratio of cement to slaked lime amounts to 1.5 to 2.3:1, the binder proportion lies in the range from 45 to 52 M % and the suspension has a water/solids factor (without foam) from 0.7 to 1.2, b) preparing a foam from water, air and a pore former, with a gross density from 40 to 50 kg/m³, c) introducing the foam into the water/solids suspension still present in the mix container with the intensive mixer running and mixing in the foam at a lower speed of rotation of the mixer mechanism within 120 seconds at the most, d) pouring the raw mix into at least one mold, e) allowing the raw mix to set to form a still plastic block having a sufficient green-state strength to allow it to be, f) lifting the plastic block off the mold bottom by means of a vacuum, g) cutting the block into individual insulating boards by means of wires and h) hardening the insulating boards in an autoclave.

15 Claims, 1 Drawing Sheet

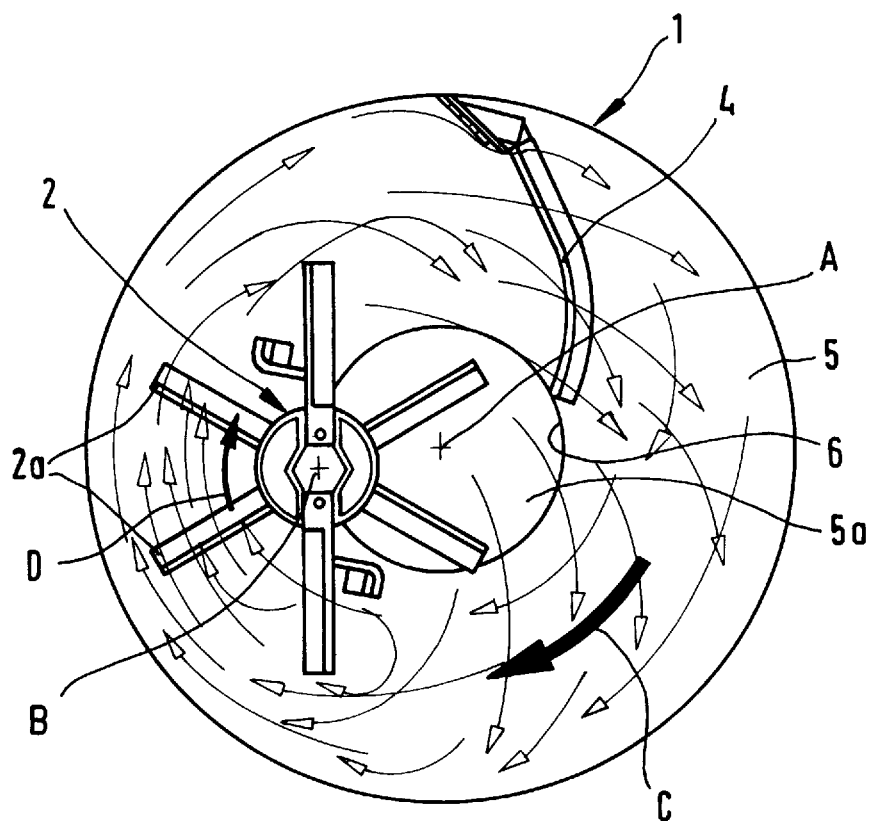

METHOD OF MANUFACTURING A LIGHT, OPEN-PORED, MINERAL INSULATING BOARD

BACKGROUND OF THE INVENTION

This invention relates to a method of manufacturing a light, porous, mineral insulating board with a gross density below 130 kg/m$^3$.

DESCRIPTION OF THE PRIOR ART

Efforts have been made for some time to develop methods of manufacturing a light, porous, mineral insulating board having the smallest possible gross density, so that such insulating boards can be used as a substitute for foamed polystyrene boards or mineral fiber boards as total heat insulation for buildings. Thus, DE 4 339 137 A1 describes a method for manufacturing heat insulating material from silica-containing material, slaked lime, water, foam and a quick-setting cement containing reactive aluminate. In order to achieve very small gross densities, it is provided that a quartz flour with a specific surface area according to BET (Brunaver-Emmett-Teller) of at least about 3 m$^2$/g, especially about 4–5 m$^2$/g, is used as the silica-containing material, the raw mix is produced with a ratio by weight of water to solids, (without the foam) of at least about 1.25 and a substantially stoichiometric amount of slaked lime with a surface area according to BET of at least about 15 m$^2$/g, for practically complete conversion of the quartz flour and the reactive aluminate, and the blanks cast in molds are removed from the mold, apart from a mold bottom, after hardening sufficiently and autoclaved in position on the mold bottom. In carrying out this method, a water/solids suspension is first produced in a first mixer from such quartz flour, slaked lime and water. A protein foam with a foam gross density in the range from about 60 to 80 kg/m$^3$ is produced in a separate foam generator and is then mixed in in the first mixer. A quick-setting cement suspension is mixed up in a second mixer and is then introduced under the water/solids suspension in the first mixer, after the mixing in of the foam, and is mixed in with the mixture previously produced. The raw mix thus produced is then poured into molds. After sufficient hardening of the mass, the mold is removed, apart from the mold bottom. The block in position on the mold bottom is then kept for about 6 hours and then introduced still in position on the mold bottom into the autoclave, where it is steam hardened, since it is too fragile to be handled unless it stays on the mold bottom. The steam hardened blocks can then be cut into board form. However, since the material has hardened, special rotating or reciprocating cutter tools are necessary for this. Cutting with tensioned wires, as is usually effected on the still plastic block with foamed or porous concrete in the "green" state, is not possible in this method, since the block is too fragile in the green state for any kind of handling without a mold bottom. The use of two mixers for making the raw mix and the cutting of the block in the hardened state increase the cost of this known method. Moreover the heat insulating material manufactured according to this method is not water-repellant.

A method of manufacturing a mineral light insulating board from foamed concrete is known from DE 4 327 074 A1, in which water, quartz flour, slaked lime and cement are put in a stationary stirrer vessel with a paddle stirring mechanism. This mixture placed in the stirrer vessel is then pumped round a colloidal mixer circuit for 5 to 10 minutes by means of a centrifugal pump, in order thereby to form a homogenous binder slurry. Glass fibers 6 to 12 mm long are then put in the stirrer vessel and mixed into the binder slurry by means of the paddle stirrer mechanism. Foam is generated in a foam generator from water, air and a pore-former and introduced to the stirrer vessel with the paddle stirrer mechanism stationary, until it is full to the brim. The foam is mixed into the binder slurry containing glass fibers by rotating the paddle stirrer mechanism for about 3 minutes and the raw mix is filled into a mold by means of the centrifugal pump and a mortar pump, which is of the auger conveyor type or a so-called peristaltic pump. After the foam concrete block has set, the mold sides are removed and the foam concrete block is cut into individual light insulating boards. These are then hardened in an autoclave and provided with a coating for surface hardening in an additional process step. The apparatus outlay for producing the mixture is large, since a centrifugal pump, a colloidal mixer and a mortar pump are necessary in addition to the paddle stirrer mechanism. The mixing times are relatively long and surface hardening is moreover necessary in a separate working step. In spite of this expenditure in machinery and time, and in spite of the use of glass fibers, which make the manufacture more expensive and lead to problems in cutting the foam concrete block and in the working of the light insulating boards, the production qualities necessary for unconditional use in practice cannot be attained. The light insulating boards manufactured according to this method do not in fact have the required properties in relation to strength, heat insulating capacity and repelling of water. (The applicants of DE 4 327 074 A1 say this themselves in their later patent application DE 4 408 088 A1, column 2, lines 39 to 54).

A method of manufacturing a porous, mineral, light insulating board is known from DE 4 408 088 A1, in which a binder slurry of cement, quartz flour, slaked lime and water is first produced in a colloidal mixer. The binder slurry is fed with the interposition of a feed pump through a first supply line to a Y-shaped mixing pipe and is mixed therein with foam, which has previously been generated in a foam gun and is fed to the mixing pipe through a second supply line. The foamed concrete mass produced by the admixture of the two aforesaid components in the mixing pipe is then fed on through a static mixer, where homogenisation of the foamed concrete mass is to take place. The foamed concrete mass is then placed in a mold box. After the foamed concrete mass has set, the mold walls are removed. The plastic block standing free on the mold bottom is then cut into insulating boards by means of tensioned wires. The insulating boards are lifted off the bottom plate by means of a vacuum gripper and placed on a hardening trolley and then hardened thereon in an autoclave. Impregnation of the boards then takes place through an additional working step in an impregnating bath based on modified water glass, a hydrophobic medium and water. The surface of the insulating boards is hardened by the impregnating medium and a water-repellent effect obtained. Here also, the apparatus outlay for carrying out the method is relatively high, since two different mixers, a mixing pipe and furthermore a feed pump are necessary. Furthermore, an immersion bath with a vacuum chamber and a drying station are necessary for the hydrophobic treatment. Moreover, adequately homogenous distribution of the foam in the raw mix cannot be attained with a static mixer.

SUMMARY OF THE INVENTION

The invention is based on the object of providing a method of manufacturing a light, open-pored, mineral insulating board with a gross density below 130 kg/m$^3$, with which insulating boards can be produced with a relatively small outlay for machinery and processing technology, the boards having very good heat insulating properties and a relatively high strength, in particular, high tensile strength, and being rendered hydrophobic.

This object is met by a method with the following steps:
a) producing a water-solids suspension by intensive mixing of the following raw materials in an intensive mixer with a rotating mix container and a mixer mechanism rotating at a higher speed, using water and, in each case referred to the total content of solids, 40 to 48 M % (mass percent) quartz flour with a specific surface according to BET of at least 2.5 m²/g, 15 to 20 M % slaked lime with a specific surface of at least 15 m²/g, 25 to 35 M % cement, 0.3 to 0.5 M % hydrophobic medium, the rest being additives, wherein the ratio of cement to slaked lime amounts to 1.5 to 2.3:1, the binder proportion lies in the range from 45 to 52 M % and the suspension has a water/solids factor (without foam) from 0.7 to 1.2,
b) preparing a foam from water, air and a pore former, with a gross density from 40 to 50 kg/m³,
c) introducing the foam into the water/solids suspension still present in the mix container with the intensive mixer running and mixing in the foam at a lower speed of rotation of the mixer mechanism within 120 seconds at the most,
d) pouring the raw mix into at least one mold,
e) allowing the raw mix to set to a still plastic block with a sufficient green-state strength,
f) lifting the plastic block off the mold bottom by means of a vacuum,
g) cutting the block into individual insulating boards by means of wires and
h) hardening the insulating boards in an autoclave.

Precisely reproducible manufacture of light, open-pored, mineral insulating boards with a gross density below 130 kg/m³, down to about 100 kg/m³, is possible with the method according to the invention. The outlay for machinery for this can be essentially reduced in that only a single mixer is necessary to make the raw mix, namely an intensive mixer with a rotating mix container and a mixer mechanism which can be driven at different speeds of rotation and which is advantageously arranged eccentrically relative to the axis of rotation of the mix container. The production of the water/solids suspension and also the addition of foam with simultaneous stirring in of the foam are effected in one and the same container. The rotating mix container with a variably drivable mixer mechanism facilitates free material movement with optimum homogenisation within the shortest possible mixing time. It is essential that the hydrophobic medium is distributed intensively and uniformly in the water and in the water/solids suspension by the mixer mechanism rotating at a high speed, before the addition of the pre-prepared foam takes place. In order that, when mixing in the foam, it is not partially destroyed by the hydrophobic medium, the mixing in must take place in the shortest possible time of 120 seconds at the most, which is sufficient however for homogenous distribution of the foam in the raw mix, where a gentle, homogenous mixing in of the foam into the water/solids suspension, without destruction of the foam, is achieved through the mixer mechanism being driven at a lower speed of rotation. The raw mix with the composition within the given ranges has the advantage that it sets within a moderate maturing time to a still plastic block with an adequate green strength, which can not only be lifted off the mold bottom by means of a vacuum but can also be cut in the green state by means of tensioned cutting wires. Because of the given formulation, the plastic block has sufficient strength to be cut in the green state. Moreover, the finished insulating boards have a relatively high compressive and bending strength after the autoclaving, so that subsequent hardening in a liquid hardening medium can be dispensed with. No glass fibers are needed either in order to attain this strength, so that the problems arising with the use of these glass fibers are obviated. In addition, a high tensile strength can be achieved with the use of Portland cement. Furthermore, the finished insulating boards are rendered hydrophobic through and through after the autoclaving, without additional impregnating treatment, i.e. they are made hydrophobic not only in the surface region and accordingly retain their hydrophobic properties even after division into smaller board sections.

Advantageous possibilities for performing the method according to the invention are given in the dependent claims.

BRIEF DESCRIPTION OF THE FIGURE

The intensive mixer used in carrying out the method according to the invention is shown schematically in plan view in the drawing.

DETAILED DESCRIPTION

A very fine quartz flour is used in carrying out the method according to the invention, with a specific surface area according to BET of at least 2.5 m²/g, especially 3 to 5 m²/g. This quartz flour is added in an amount of 40 to 48 M %.

The added slaked lime has a specific surface area of at least 15 m²/g. The amount of slaked lime can vary within a range from 15 to 20 M %. All the aforesaid M % values (mass percent values) refer to the total solids content.

The use of Portland cement in an amount from 25 to 35 M % as the cement raw material has the advantage that Portland cement is relatively cheap and the finished insulating boards have a high tensile strength. The raw mix has a long open working time, so that the mixer only has to be cleaned in between mixing operations when there are long down times. However, a relatively long time elapses before the raw mass has attained sufficient green strength after pouring into the mold. This long setting time can however be compensated for by a larger number of molds, in order to ensure an adequate production capacity.

The maturing time can be substantially reduced by the use of a quick setting cement and the open working time of the raw mix can also be influenced by the amount of the quick setting cement. However, with very high proportions of quick-setting cement, too rapid a binding reaction takes place and with too small proportions resulting in the green strength of the plastic block not being adequate, so that it cannot be cut with tensioned cutting wires. Quick-setting cement is therefore used in an amount from 25 to 35 M %. When using a relatively high amount of quick-setting cement, the raw mix sets after a relatively short time and the plastic block can then be de-molded, transported with vacuum grippers and cut by means of tensioned wires. It has surprisingly been shown that, in spite of the high proportion of quick-setting cement, the finished insulating boards have sufficiently high compressive and bending strength. This result would not be expected, because the aluminate contained in the quick-setting cement interferes with the formation of tobermorite. A mixture of Portland cement and quick-setting cement could optionally be used.

The open time in the mixer before completion of the pouring into the mold can be adjusted by the ratio of quick-setting cement to slaked lime. The ratio of quick-setting cement to slaked lime should amount to 1.5 to 2.3. As already stated, the open time is reduced by increasing the proportion of quick-setting cement.

The binder proportion, i.e. slaked lime plus cement, should lie in the range from 45 to 52 M %. With binder proportions above 53%, settling out of the raw mix poured into the mold takes place during setting.

A mass hydrophobic treatment takes place with the method according to the invention, i.e., the hydrophobic medium is added directly to the water/solids suspension before the mixing in of the foam. The subsequent hydrophobic treatment of the autoclaved insulating boards is thus obviated. A silicone oil customary in the trade is used as the hydrophobic medium, in an amount from 0.3 to 0.5 M %, preferably about 0.4 M %.

In addition to quartz flour, which is used at a mean grain size of about 3 μm and a maximum grain size of about 10 μm, slaked lime, cement and hydrophobic medium, additives can also be used in the production of the water/solids suspension, such as anhydrite, silicates, fluidizers (for lowing the viscosity) and recovered material in an amount of about 5 M %, where the proportion of recovered material can amount to about 3 M %. As recovered material, there is to be understood hardened insulating material prepared by grinding, which can result during the production in the mold from excess and waste.

A surfactant foam, preferably a protein foam, is used as the foam, where the foam gross density should lie in the range of from 40 to 50 kg/m$^3$.

The water/solids suspension consisting of water and the quartz flow solids, slaked lime, cement, hydrophobic medium and additives should have a water/solids factor of about 0.7 to 1.1, preferably 0.7 to 0.9, before the addition of the foam. The viscosity of the suspension increases markedly with a decreasing water/solids factor, without and especially with the foam. An increase in the green strength can also be established. The stirring in of the foam is however more difficult with a decreasing water/solids factor. On the other hand, the water/solids factor should not be increased, since the casting stability is reduced by this, the setting time is prolonged and the amount of water in the block is increased, which is disadvantageous for reasons of drying technology. A water/solids factor of 0.7 to 0.9 is therefore recommended, since good homogenisation during mixing and good production characteristics are then obtained.

The formulation is therefore made up as follows:

Quartz flour 40–48 M %

Slake lime 14–20 M %

Portland cement 25–35 M %

Anhydrite about 2 M %

Recovered material about 3 M %

Silicone oil about 0.4 M %

Protein foam

Water

Water/solids factor 0.7–0.9

A known intensive mixer is used to carry out the method and is shown schematically in the drawing. The mixer consists of a rotatable mix container 1 with a capacity of about 1000 liter, preferably turning about a vertical axis A and driven by a drive motor with adjustable speed of rotation. A mixer mechanism 2 with a plurality of mixing paddles 2a, which can be arranged in several stages one above the other, is provided in the mix container. The mixer mechanism 2 rotates about the axis B, which is disposed eccentrically to the container axis A. The mixer mechanism 2 is driven by a separate drive motor with an adjustable speed of rotation in the range of speeds from 200 to 500 rpm. A stationary material deflector 4 is further provided in the mix container 1. The bottom 5 of the container has an emptying opening 6, which is closed during the mixing by a central bottom part 5a. The mix container 1 and the mixer mechanism 2 are driven in the sense of rotation, as indicated by the arrows C and D, so that the mixer operates according to the cross-flow principle. Such an intensive mixer facilitates free movement of materials, combined with optimum homogenisation within the shortest possible mixing time, thanks to the rotating mix container.

The water needed for mixing up is pre-heated to a temperature which, depending on the temperature of the solids, yields a temperature of the water/solids suspension of 20° to 25° C., before the addition of foam takes place. This temperature should amount to 25° C. at the most, since the stability and homogeneity of the foam is strongly temperature-dependent. Too low temperatures prolong the maturing time. The pre-heated water is metered into the mix container 1. The solids quartz flour, slaked lime, cement, anhydrite and recovered material are weighed out one after the other and put as well as the silicone oil into the running mixer. By a suitable speed of rotation of the mix container 1 around 20 rpm and of the mixer mechanism 2 driven at a higher speed of rotation in the region of 500 rpm, an intensive mixing of the solids and the silicone with the water is carried out within 20 to 30 seconds and a water/solids suspension results.

The protein foam is generated in a foam gun and is introduced to the mixer while it is running. The mix container is driven at the same speed of rotation as before but the mixer mechanism is driven with a substantially lower speed of rotation in the region of 200 rpm. The lower speed of rotation of the mixer mechanism is very important, since the foam is otherwise destroyed. Because the silicone oil would also lead to destruction of the foam under the influence of the mixing movement, the mixing in of the foam should last not longer than 120 seconds from the beginning of foam addition. The raw mix is highly viscous and must be put into the mold straightaway and quickly when using quick-setting cement, because of the rapid hardening thereof. Emptying the mixer takes place through the bottom opening 6 by opening the central bottom part 5a, from whence the raw mix is filled into the mold directly through a chute.

The raw mix is then allowed to set in the mold, which takes about 18 to 24 hours in the case of Portland cement and about 4 to 6 hours in the case of quick-setting cement. The raw mix has then set to a plastic block. By lifting with use of a vacuum, the block is raised from the mold bottom, placed on a hardening grating and freed from the mold. The plastic block has sufficient green strength so that it can be cut in the green state by means of tensioned wires into individual insulating boards with the desired dimensions. The insulating boards on the hardening grating are then hardened in an autoclave under saturated steam conditions.

After putting the hardening grating in the autoclave, a vacuum of −0.2 to −0.5 bar is created therein. The mass can be heated up more quickly because of the evacuation and be brought up to maximum temperature. The more intensive the vacuum treatment, the smaller is the temperature difference between the centre of the block and the steam space. Temperature differences between inner and outer block regions are reduced by slow steaming up of the autoclave, so that thermal stresses which lead to cracks are avoided. A two-stage heating ramp has proved advantageous, wherein a smaller heating up gradient is necessary in the lower pressure region, in order to avoid the insulating boards running or being damaged. Crack-free hardening is possible with heating up times of about 4 hours. In order to enhance the reliability of the method, the following hardening time amounts to 8 hours at a held pressure of 11 bar. Since too rapid relief of the steam leads to hardening damage in the insulating material, the steam relief time should be from 2 to 4.5 hours.

The light insulating boards which can be manufactured with the method according to the invention have a gross density below 130 kg/m$^3$ and mineralogically consist essentially of tobermorite. The overall porosity amounts to more than 90% by volume, in particular 97% by volume. Nevertheless, a relatively high compressive and bending strength, in particular a high tensile strength are attained. When using Portland cement and also a quick-setting cement, insulating boards with the following values are produced:

| | |
|---|---|
| Gross density kg/m$^3$ | 100–120 |
| Compressive strength N/mm$^2$ | 0.5–0.6 |
| Tensile strength N/mm$^2$ | 0.07–0.09 |
| Thermal conductivity W/mK | 0.04 |

We claim:

1. A method of manufacturing a light, open-pored, mineral insulating board having a gross density less than 130 kg/m$^3$, said method comprising the steps of:

providing a mixing apparatus comprising a rotatable mixing container having a mixer disposed therein having an axis of rotation eccentrically disposed to the axis of rotation of the mixing container, said mixing container and mixer being driven independently of each other;

introducing raw materials into said mixing container, said raw materials comprising, in mass % with respect to the total solids content, 40–48% quartz flour having a BET specific surface area of at least 2.5 m$^2$/g, 15–20% slaked lime having a specific surface area of 15 m$^2$/g, 25–35% cement, 0.3–0.5% of a hydrophobic medium and the balance being additives, the ratio of cement to slaked lime being 1.5–2.3:1 and the slaked lime plus cement content being from 45–52%;

mixing the raw materials in said mixing apparatus to form a water-solids suspension, said water-solids suspension having a water/solids factor of from 0.7 to 1.2 and said mixing being performed by rotating said mixing container at a first speed of rotation and said mixer at a second speed of rotation which is greater than the first speed of rotation;

forming a foam having a gross density from 40 to 50 kg/m$^3$ from water, air and a pore former;

introducing the foam into the water-solids suspension while rotating said mixer at a speed of rotation which is lower than said second speed of rotation to homogeneously mix the foam and the water-solids suspension and form a homogeneous raw mix, the foam and the water-solids being mixed for a time period not exceeding 120 seconds from the introduction of the foam;

pouring the raw mix into at least one mold;

allowing the raw mix to set in said at least one mold until it forms a plastic block having a consistency which allows it to be lifted from said at least one mold and cut;

lifting said plastic block from said at least one mold;

cutting the plastic block to form individual insulating boards; and hardening the insulating boards in an autoclave.

2. A method according to claim 1, in which quartz flour with a BET specific surface area of 3 to 5 m$^2$/g is employed.

3. A method according to claim 1, in which a ratio of cement to slaked lime of 2.0:1 is employed.

4. A method according to claim 1, in which the slaked lime plus cement content amounts to about 50%.

5. A method according to claim 1, in which a water/solids suspension with a water/solids factor of about 0.7 to 0.9 is employed.

6. A method according to claim 1, in which Portland cement is used as the cement.

7. A method according to claim 1, in which a quick setting cement containing reactive aluminate is used as the cement.

8. A method according to claim 1, in which a surfactant foam is employed as the foam.

9. A method according to claim 1, in which the temperature of water used to produce the water/solids suspension is selected in dependence on the temperature of the solids such that the water/solids suspension has a temperature from 20° to 25° C. before the addition of foam.

10. A method according to claim 1, in which silicone oil is the hydrophobic medium.

11. A method according to claim 10, in which about 0.4% silicone oil is added to the water/solids suspension.

12. A method according to claim 1, in which the foam is introduced to the lower third of the mix container.

13. A method according to claim 1, in which the pouring of the raw mix into the mold is effected directly from the mixing apparatus through a chute.

14. A method according to claim 10, in which the foam is introduced to the lower third of the mix container.

15. A method according to claim 8, wherein said surfactant foam is a protein foam.

* * * * *